United States Patent
Yamaguchi et al.

(10) Patent No.: US 10,196,194 B2
(45) Date of Patent: Feb. 5, 2019

(54) SELF-CURLING NON-WOVEN SLEEVE AND METHOD OF CONSTRUCTION THEREOF

(71) Applicant: FEDERAL-MOGUL POWERTRAIN, LLC, Southfield, MI (US)

(72) Inventors: Hiroki Yamaguchi, Sagamihara (JP); Kouichi Satoh, Machida (JP); Benoit Laurent, Trosly Breuil (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/297,330

(22) Filed: Oct. 19, 2016

(65) Prior Publication Data
US 2017/0101245 A1 Apr. 13, 2017

Related U.S. Application Data

(62) Division of application No. 13/793,397, filed on Mar. 11, 2013, now Pat. No. 9,478,954.
(Continued)

(51) Int. Cl.
*B65D 81/03* (2006.01)
*F16L 57/06* (2006.01)
(Continued)

(52) U.S. Cl.
CPC .............. *B65D 81/03* (2013.01); *B65D 65/02* (2013.01); *B65D 85/08* (2013.01); *F16L 57/04* (2013.01);
(Continued)

(58) Field of Classification Search
CPC ........ F16L 57/06; F16L 57/04; H02G 3/0468; H02G 3/0481; Y10T 428/13; Y10T 442/494; Y10T 442/60; B65D 81/03; B65D 85/08; B65D 65/02; H01B 7/0045; H01B 7/1805
See application file for complete search history.

(56) References Cited

U.S. PATENT DOCUMENTS

2011/0275268 A1* 11/2011 Harris ................. H02G 3/0481
442/319

FOREIGN PATENT DOCUMENTS

GB 2342708 A * 4/2000 ................ F16L 7/00
JP 2010116933 A 5/2010
(Continued)

*Primary Examiner* — Vishal I Patel
(74) *Attorney, Agent, or Firm* — Robert L Stearns; Dickinson Wright PLLC

(57) ABSTRACT

A self-wrapping nonwoven sleeve for routing and protecting elongate members and method of construction thereof is provided. The sleeve includes a non-woven wall having a thickness extending between inner and outer sides. The wall has opposite edges extending along a length of the sleeve between opposite ends. The opposite edges are biased into a self-wrapped configuration by heat-set material of the non-woven wall to define a tubular cavity. The non-woven wall includes first and second portions extending between the opposite edges. The first portion and second portion have respective first and second thicknesses extending between the inner and outer sides, wherein the first thickness is greater than the second thickness and wherein the first portion provides flexibility to the wall and the second portion is heat set to bias the wall into its self-wrapped configuration.

9 Claims, 4 Drawing Sheets

Related U.S. Application Data

(60) Provisional application No. 61/622,788, filed on Apr. 11, 2012.

(51) Int. Cl.
    *H02G 3/04*     (2006.01)
    *F16L 57/04*     (2006.01)
    *B65D 85/08*     (2006.01)
    *B65D 65/02*     (2006.01)
    *H01B 7/00*     (2006.01)
    *H01B 7/18*     (2006.01)

(52) U.S. Cl.
    CPC ............ *F16L 57/06* (2013.01); *H01B 7/0045* (2013.01); *H01B 7/1805* (2013.01); *H02G 3/0468* (2013.01); *H02G 3/0481* (2013.01); *Y10T 428/13* (2015.01); *Y10T 442/494* (2015.04); *Y10T 442/60* (2015.04)

(56) References Cited

FOREIGN PATENT DOCUMENTS

| | | | |
|---|---|---|---|
| JP | 2010523829 | A | 7/2010 |
| JP | 2010523839 | A | 7/2010 |
| WO | 2008119880 | A | 10/2008 |
| WO | 2008128022 | A1 | 10/2008 |
| WO | 2011143193 | A2 | 11/2011 |

\* cited by examiner

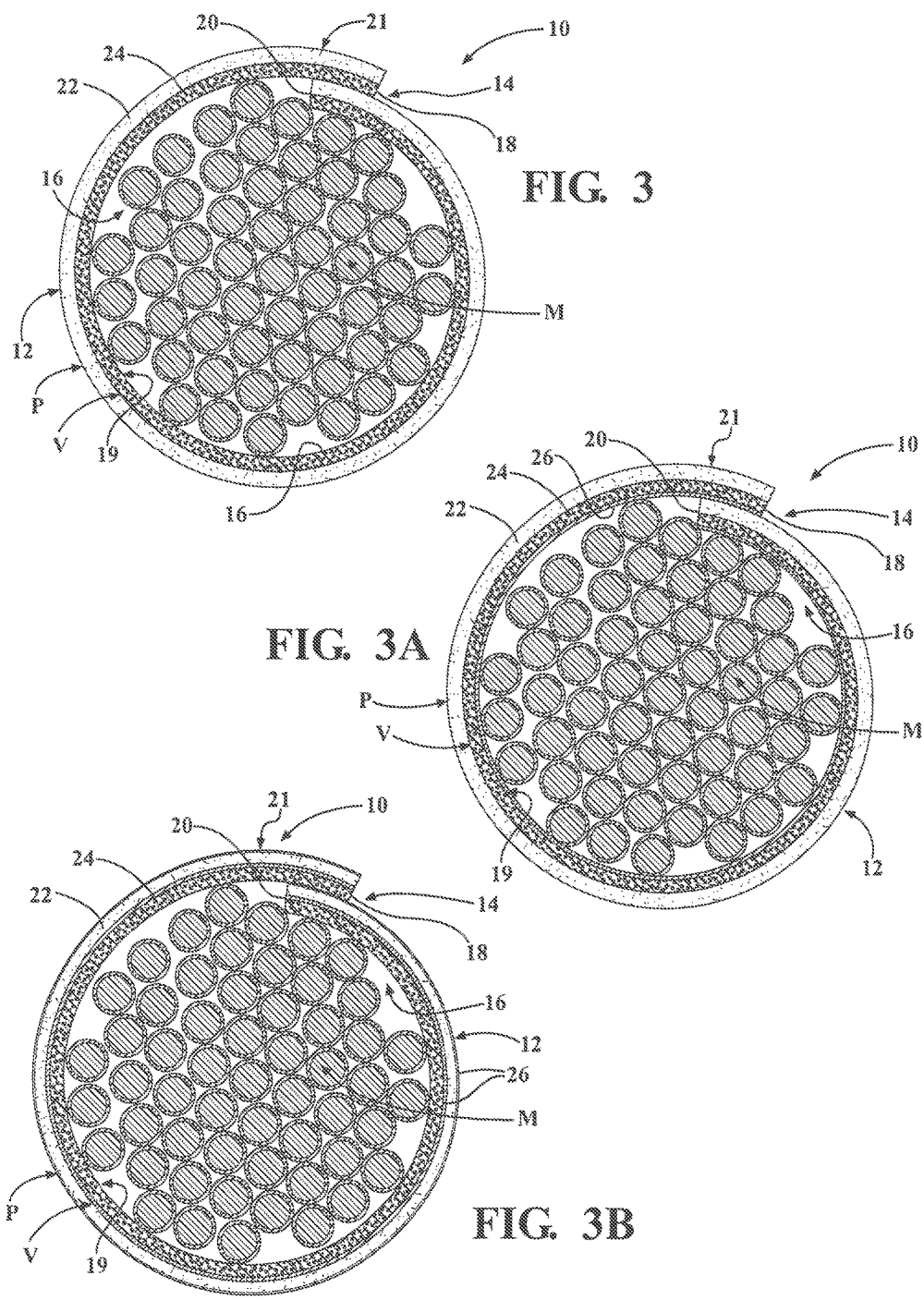

SELF-CURLING NON-WOVEN SLEEVE AND METHOD OF CONSTRUCTION THEREOF

CROSS-REFERENCE TO RELATED APPLICATION

This Divisional application claims the benefit of U.S. Utility application Ser. No. 13/793,397, filed Mar. 11, 2013, which claims priority to U.S. Provisional Application Ser. No. 61/622,788, filed Apr. 11, 2012, both of which are incorporated herein by reference in their entirety.

BACKGROUND OF THE INVENTION

1. Technical Field

This invention relates generally to protective non-woven sleeves which can be fitted about elongated items such as wires, wire harnesses, pipes, hoses tubing and the like to protect such elongated items from heat, cuts, chafing, abrasion and/or to provide shielding from vibration, noise and/or harshness.

2. Related Art

U.S. Pat. Nos. 7,523,532 and 7,754,301 disclose a nonwoven sleeve for use in covering elongated items, such as wires, wire harnesses, pipes, hoses tubing and the like. Such a non-woven sleeve is taught as being uniformly compressed to a desired density (which can vary depending upon the application) and also biased to a self-curling shape, so that when the sleeve is forced open along its slit edge and positioned about the elongated item, releasing the sleeve causes it to self-curl and wrap about the elongated item. Such a sleeve has the advantage of being self-wrapping and being made of non-woven material, but also has its limitations in that the densified self-curling attribute has the effect of making the product rather stiff and resistant to flexing, which can present a challenge when the sleeve is to be used to cover an elongated item that has curvature (e.g., a curved wire harness).

SUMMARY OF THE INVENTION

A self-wrapping nonwoven sleeve for routing and protecting elongate members is provided. The sleeve includes an elongate non-woven wall having inner and outer sides with a thickness of the wall extending between the inner and outer sides. The wall has opposite edges extending along a longitudinal axis of the sleeve between opposite ends of the sleeve. The opposite edges are biased into a self-wrapped configuration about the longitudinal axis to define a tubular cavity. The opposite edges are extendable away from one another under an externally applied force to expose the cavity for insertion or removal of the elongate members and return to their self-wrapped configuration upon removal of the externally applied force. The non-woven wall includes at least one circumferentially extending first band portion extending between the opposite edges and at least one circumferentially extending second band portion extending between the opposite edges. The at least one first band portion has a first thickness and first density extending between the inner and outer sides and the at least one second band portion has a second thickness and second density extending between the inner and outer sides. The first thickness is greater than the second thickness and the first density is less than the second density.

In accordance with another aspect of the invention, the non-woven wall includes a plurality of the first band portions and a plurality of the second band portions.

In accordance with another aspect of the invention, the at least one second band portion includes heat-set material that exerts a self-curling bias force to bias the opposite edges into their self-wrapped configuration to define the tubular cavity.

In accordance with another aspect of the invention, the at least one first band portion imparts increased flexibility to the sleeve relative to the at least one second band portion as a result of the at least one first band portion not including heat-set material.

In accordance with another aspect of the invention, the inner side is smooth and the outer side includes undulations of circumferentially extending peaks and troughs.

In accordance with another aspect of the invention, a foil layer is bonded to at least one of the inner side and the outer side.

In accordance with another aspect of the invention, the foil layer is bonded to the inner side.

In accordance with another aspect of the invention, the foil layer is bonded to the outer side.

In accordance with another aspect of the invention, the foil layer is bonded to the inner side and the outer side.

In accordance with another aspect of the invention, a self-wrapping nonwoven sleeve for routing and protecting elongate members is provided including an elongate non-woven wall having inner and outer sides with a thickness of the wall extending across the inner and outer sides. The wall has opposite edges extending along a longitudinal axis of the sleeve between opposite ends of the sleeve. The edges are biased into a self-wrapped configuration about the longitudinal axis to define a tubular cavity. The edges are extendable away from one another under an externally applied force to expose the cavity for insertion or removal of the elongate members and return to their self-wrapped configuration upon removal of the externally applied force. The non-woven wall includes a plurality of first portions isolated from one another by at least one second portion. The plurality of first portions have a first thickness extending between the inner and outer sides and a first density and the at least one second portion has a second thickness extending between the inner and outer sides and a second density. The first thickness is greater than the second thickness and the first density is less than the second density.

In accordance with another aspect of the invention, a method of constructing a self-wrapping sleeve used to route and protect elongate members is provided. The method includes forming an elongate non-woven wall having a thickness extending between opposite inner and outer sides and having opposite edges extending between opposite ends of the wall. Further, heat-setting the non-woven wall into a self-wrapped configuration to define a tubular cavity. In addition, forming at least one circumferentially extending first band portion having a first density and first thickness extending between the opposite edges and forming at least one circumferentially extending second band portion having a second density that is greater than the first density of the at least one first band portion and having a second thickness extending between the opposite edges, wherein the second thickness of the at least one second band portion is less than the first thickness of the at least one first band portion.

In accordance with another aspect of the invention, the method further includes forming a plurality of the first band portions and a plurality of the second band portions in the nonwoven wall.

In accordance with another aspect of the invention, the method further includes heat-setting material in the at least one second band portion during the heat-setting step so that the at least one second band portion exerts a bias force to bias the edges into the self-wrapped configuration.

In accordance with another aspect of the invention, the method further includes avoiding heat-setting the at least one first band portion so that the at least one first band portion has an increased flexibility relative to the at least one second band portion.

In accordance with another aspect of the invention, the method further includes forming the inner side having a smooth surface and forming the outer side having undulations of circumferentially extending peaks and troughs.

In accordance with another aspect of the invention, the method further includes bonding a foil layer to at least one of the inner and outer sides.

In accordance with another aspect of the invention, a method of constructing a self-wrapping sleeve used to route and protect elongate members includes forming an elongate non-woven wall having a thickness extending between opposite inner and outer sides and having opposite edges extending between opposite ends of the wall. Further, heat-setting the non-woven wall into a self-wrapped configuration to define a tubular cavity and forming at least one circumferentially extending first band portion having a first density and first thickness extending between the opposite edges. Further, forming a plurality of first portions isolated from one another by at least one second portion, with the plurality of first portions having a first thickness extending between the inner and outer sides and having a first density and with the at least one second portion having a second thickness extending between the inner and outer sides and having a second density, wherein the first thickness is greater than the second thickness and the first density is less than the second density.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

FIG. 3 is a cross-sectional view of the sleeve of FIG. 1;

FIGS. 3A-3C are similar views to FIG. 3 showing alternate embodiments of a sleeve constructed in accordance with further aspects of the invention;

DETAILED DESCRIPTION OF PRESENTLY PREFERRED EMBODIMENTS

Figure 1:
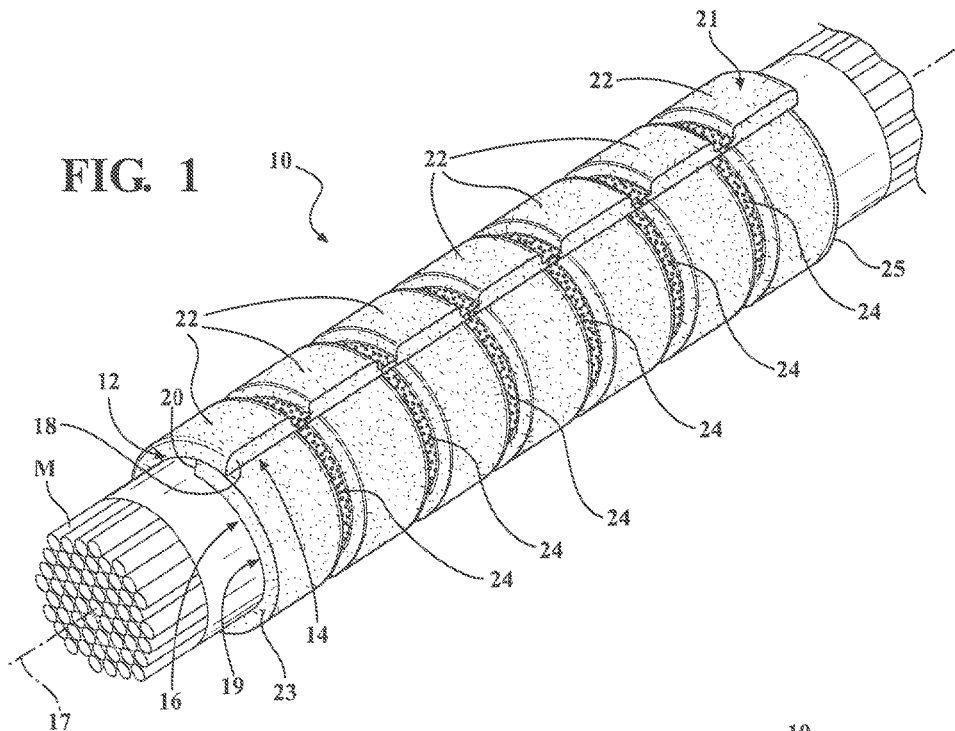
FIG. 1 is a perspective view of a non-woven sleeve constructed in accordance with one aspect of the invention.

Referring in more detail to the drawings, FIGS. 1-4 illustrate a sleeve 10 constructed in accordance with one aspect of the invention that is self-wrapping as a result of being heat-set in construction. The sleeve 10 has a wall 12 that is initially constructed as a substantially flat non-woven material that is subsequently heat-formed into a biased, self-wrapping tubular configuration to form the tubular sleeve 10. With the wall 12 being heat-set to take on its curled configuration, a split, also referred to as seam or split seam 14, extends along the length of the sleeve 10, wherein the wall 12 provides a circumferentially enclosed inner cavity 16 when in its relaxed, self-wrapped configuration. The cavity 16 is generally tubular and readily accessible along a central longitudinal axis 17 of the sleeve 10 so that elongate members M, such as wires or a wire harness, for example, can be readily disposed radially toward the axis 17 into the cavity 16, and conversely, removed from the cavity 16, such as during service via forcing lengthwise extending free edges 18, 20 of the sleeve 10 away from one another against the heat-set bias imparted within at least a portion of the wall 12 to open the seam 14 against the self-closing, heat-formed biasing force by an amount sufficient to introduce or remove the elongated members M through the opened split seam 14.

The non-woven wall 12 forms the entirety of the sleeve 10, unless a further layer is desired, as discussed below. Accordingly, the construction of the sleeve 10 eliminates the requirement for additional layers of material to provide protection or other functions, e.g. curling. The material of the nonwoven wall 12 is constructed, at least in part, of any type and combination of heat-formable fibrous materials. The material may be selected as an abrasion resistant, flexible, resilient, acoustic dampening polymeric material, such as polyester, for example. The exemplary selected fibrous material may be, without limitation, non-woven poly(ethylene terephthalate) (PET). The material may include a base polymeric material (such as PET, by way of example and without limitation) combined with any number and type of polymeric or non-polymeric filler materials (e.g., chopped waste fabric, shop rags, Asian cardboard, etc.). The sleeve 10 is well suited to protect the elongate members M within the cavity 16 against abrasion, vibration and damage, while also inhibiting the elongate members M from rattling and squeaking, or otherwise producing unwanted harshness and/or noise. In addition, as a result of the materials and processes used to construct the sleeve 10, the sleeve 10 is both economical in manufacture and in use.

The sleeve 10 can be constructed from a flat or substantially flat sheet of the non-woven material having an initial uniform thickness (t, FIG. 2) extending between opposite inner and outer sides 19, 21 and a uniform density over its entirety. The non-woven material for the sleeve 10 will have a designated length as well as a designated width. The selected length will correspond at least generally to the finished length of the sleeve 10 that extends between opposite ends 23, 25 of the sleeve. The selected width will correspond generally to the sleeve circumference, and thus determines the diameter of the sleeve 10 that is desired, but, as shown in FIGS. 1-3, the selected width extending between the opposite edges 18, 20 should be provided so that when the sleeve 10 is in its relaxed or substantially relaxed state and in its closed, tubular configuration, the edges 18, 20 along the split seam 14 overlap and extend beyond one another, if desired, to bound the cavity 16 about its entire circumference.

The substantially planar sheet of non-woven material, upon being initially constructed, is further processed in a melting or heat-forming operation such that at least one first portion, also referred to as first band portion, and shown as a circumferentially extending first band portion 22 (extends across the width of the sleeve from one edge 18 to the opposite edge 20) is provided having an associated first density of the nonwoven material, and further such that there is at least one second portion 24, also referred to as second band portion 24, and shown as a circumferentially extending second band portion 24 (extends across the width of the sleeve from one edge 18 to the opposite edge 20) provided having an associated second density that is different than that of the first density. As illustrated in FIGS. 1-4, there is preferably a plurality of such first and second band portions 22, 24 alternating along the length of the sleeve 10, such that the first band portions 22 isolate the second band portions 24 from one another, and vice versa. The first and second band portions 22, 24 may be arranged in alternating sequential manner along a part of the sleeve's length or the entire length of the sleeve 10, with each pair of adjacent first band portions 22 being separated and spaced axially from one another by an intervening second band portion 24, and vice versa. The axially extending width of the corresponding first and second band portions 22, 24 can be precisely controlled to provide the desired amount of flex (provided by the individual first band portions 22) and rigidity and curl (provided by or substantially by the individual second band portions 24) to the sleeve 10. The second density of the second band portions 24 is greater than the first density of the first band portions 22 as a result of being heat-set and compressed. It will further be seen that the thickness (t1) of the first band portions 22 is relatively greater than the thickness (t2) of the second band portions 24. The reduced thickness t2 of the second band portions 24 relative to the thickness t1 of the first band material may be attributed solely to the increased densification of the second band material caused during heat-setting of the second band portions 24. The first density of the first band material in the first band portions 22 may remain the same as, or substantially the same as, the starting density of the sheet of non-woven material used to make the sleeve 10, and as such, the thickness t1 of the first band portions 22 can remain the same or substantially the same as the original thickness t of the nonwoven material.

Figure 2:
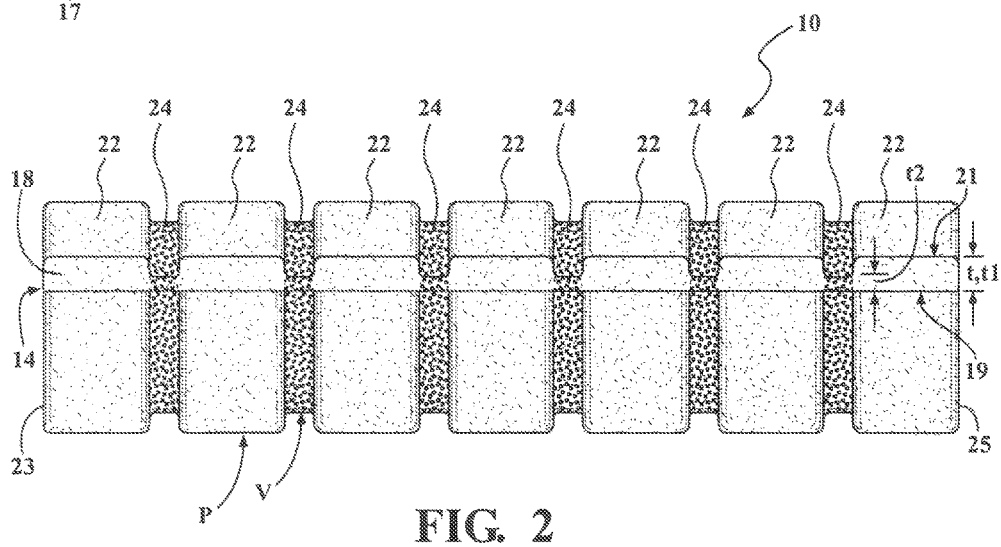
FIG. 2 is a side view of the sleeve of FIG. 1.

The second band portions 24 of higher or increased density may be heat-set into a curled configuration corresponding to that of FIGS. 1-3. Such heat-setting imparted within the second band portions 24 has the effect of imparting a self-curling attribute to the entire sleeve 10, including the first band portions 22 that may not in themselves be heat-set, but which nonetheless curl because they are influenced by the closely neighboring heat-set second band portions 24. The heat-setting may be imparted during the shaping process of the sleeve 10 and may include passing the nonwoven sheet material between two rollers that may selectively compress and heat the portions of the sleeve 10 corresponding to the second band portions 24 while not compressing other portions corresponding to the first band portions 22 at all, or at least to a lesser extent than the second portions 24. The selective heating and rollers may impart both the increased relative density of the second band portion 24 as well as imparting the self-curling properties to the second band portions 24. The same heat-setting can be achieved by a press and by using conductive or ultrasonic heating to the selected second band regions 24 only. As a result of being compressed and heat-set, the second hand portions 24 are relatively stiff and relatively hard as compared to the softer and more flexible first portions 22. As can be seen in the drawings, the heat-setting causes the inner side 19 to remain smooth, while causing the outer side 21 to take on an undulating form of alternating peaks P and valleys V. This is due to the material within the second band portions 24 being compressed and heat-set along the outer side 21, while the inner side 19 is supported against a flat or smooth surface during the heat-setting process. As such, the inner side 19 remains smooth against the elongate member M.

Figure 4:
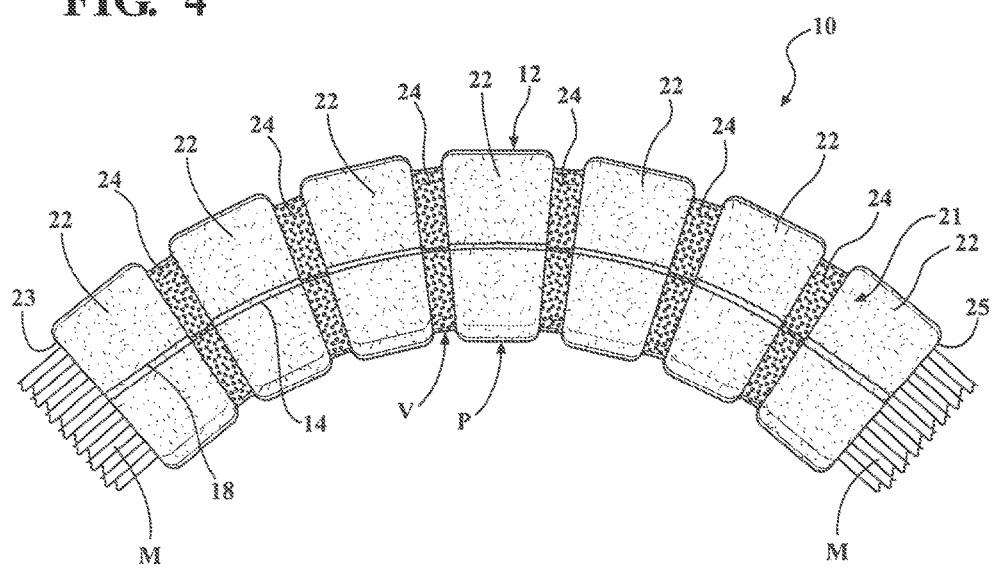
FIG. 4 is a side view of the sleeve of FIG. 1 shown wrapped about a curved elongated item.

The resultant non-woven sleeve 10 has the benefit of being self-curling by virtue of the heat-set, densified second band portions 24, and also has the benefit of being flexible and bendable about corners by virtue of the soft and flexible first band portions 22. By staggering the first and second portions 22, 24 axially along the length of the sleeve 10, the sleeve 10 is self-curling, flexible, and yet possesses high crush strength. As illustrated in FIG. 4, the sleeve 10 can be readily wrapped about an elongated member M (e.g., a wire harness) that extends or is arced along a bend or curve. The non-heat seat first portions 22 provide the primary ability of the sleeve 10 to be flexed, wherein the first portions 22 are able to stretch and compress as needed to allow the sleeve 10 to bend without kinking or without causing the spit seam 14 to open. In addition, the heat-set second portions 24 act to bias the opposite edges 18, 20 about the longitudinal axis 17 and to maintain the wall 12 in its self-wrapped tubular configuration, while also providing the sleeve 10 with enhanced hoop strength to prevent the sleeve 10 from being crushed. Accordingly, the sleeve 10 is self-curled and closed about the harness M due to the self-curling second band portions 24, but is also able to flex and bend along its length due to the relatively soft and flexible first band portions 22 so as to follow the curvature of the wire harness M.

Figure 3C:
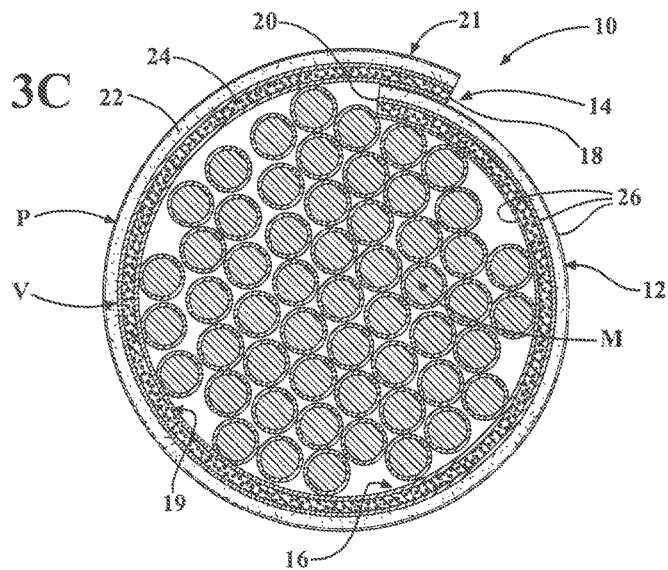

FIGS. 3A-3C illustrate an alternative or optional feature whereby a layer of foil 26 is added to one side or both sides of the sleeve 10. In FIG. 3A, the layer of foil 26 is bonded to the inner side 19 of the sleeve 10; in FIG. 3B the layer of foil 26 is bonded to the outer side 21 of the sleeve 10, and in FIG. 3C two layers of foil 26 are bonded to both the inner and outer sides 19, 21 of the sleeve 10. The remaining body of the sleeve 10 is otherwise non-woven material as described above. It should be recognized that the layer(s) of foil 26 can be bonded to their respective sides 19, 21 before heat-setting the sleeve 10, thereby avoiding having to uncurl the wall 12 to apply the layer(s) 26.

Figure 5:
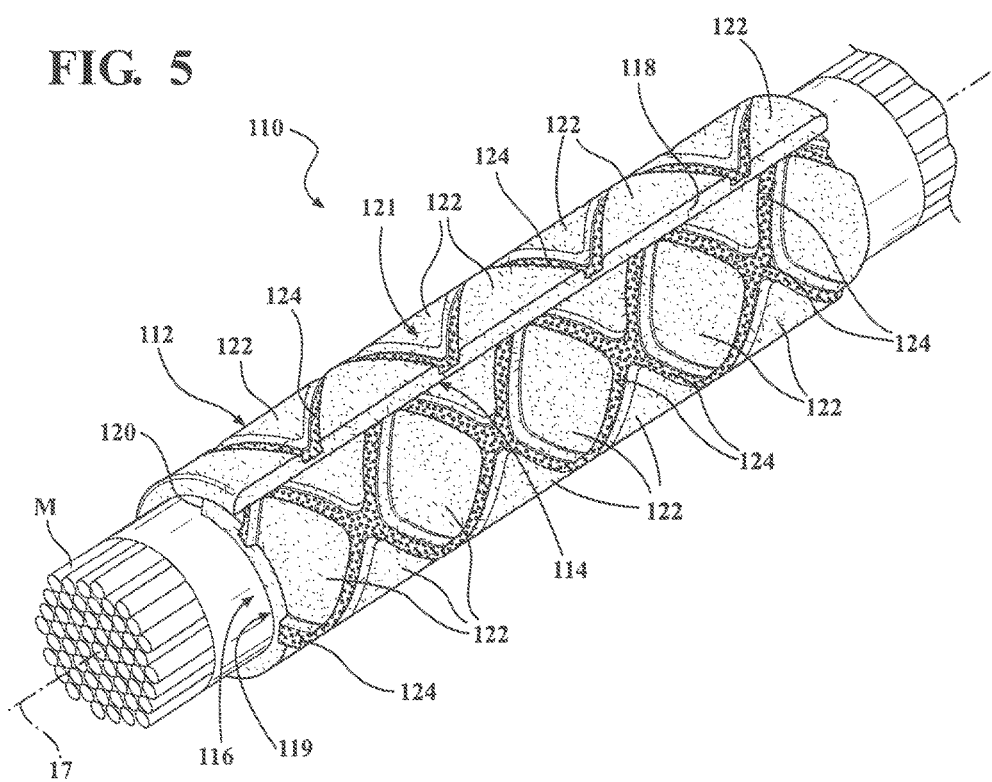
FIG. 5 is a perspective view of a non-woven sleeve constructed in accordance with another aspect of the invention.

In FIG. 5, a sleeve 110 constructed in accordance with another aspect of the invention is shown, wherein the same reference numerals, offset by a factor of 100, are used to identify like features. The sleeve 110 is similar to the sleeve 10 in that it is a self-wrapping sleeve as a result of being heat-formed in construction. The sleeve 110 has a wall 112 that is initially constructed as a substantially flat non-woven material that is subsequently heat-formed into a biased, self-wrapping tubular configuration to form the tubular sleeve 110.

The wall 112 is similar to the wall 12 in that it is heat-set to take on its curled configuration, forming a split seam 114 extending along the length of the sleeve 110. A generally tubular cavity 116 is readily accessible along a central longitudinal axis 117 of the sleeve 110 so that elongate members M can be readily disposed radially into the cavity 116, and conversely, removed from the cavity 116 by forcing lengthwise extending free edges 118, 120 away from one another, whereby the edges 118, 120 return under the bias imparted within the wall 112 upon release of the external force.

The wall 112 is constructed initially the same as the wall 12, and thus, it is constructed as a substantially planar sheet of non-woven material, from the same materials discussed above for the wall 12, having an initial uniform thickness extending between opposite inner and outer sides 119, 121 and having a uniform or substantially uniform density over its entirety. Upon being initially constructed, the wall 112 is further processed in a melting or heat-forming operation such that at least one first portion, also referred to as first band portion, and shown as a plurality of isolated first portions 122 are provided having an associated first density of the nonwoven material, and further, such that there is at least one second portion 124, also referred to as second band portion, and shown as a continuous, symmetrically patterned second portion 124 extending over the entirety of the outer side 121 having an associated second density that is different than that of the first density. The second density of the second band portion 124 is greater than the first density of the first band portions 122 as a result of being heat-set and compressed, thereby providing the second portion 124 with a reduced, densified thickness relative to the thickness of the first portions 122, as discussed above for the wall 12. As illustrated in FIG. 5, the second portion 124 isolates the first portions 122 from one another, thereby forming islands of the first portions 122, shown as being generally diamond-shaped, though other shapes are contemplated, e.g. honeycomb, spiral, and otherwise. Other than the shape and configurations of the first and second portions 122, 124, the construction and resulting sleeve 110 is the same as discussed above for the sleeve 10. The function of the first and second portions 122, 124 is the same as described above for the sleeve 10, and thus, no further discussion is believed necessary.

The foregoing description is exemplary rather than limiting in nature, and as such, it is to be understood that the above detailed description is with regard to some presently preferred embodiments, and that other embodiments readily discernible from the disclosure herein by those possessing ordinary skill in the art are incorporated herein and considered to be within the scope of any ultimately allowed claims.

What is claimed is:

1. A method of constructing a self-wrapping sleeve used to route and protect elongate members, comprising:
    forming an elongate non-woven wall having a thickness extending between opposite inner and outer sides and having opposite edges extending between opposite ends of the non-woven wall;
    heat-setting the non-woven wall into a self-wrapped configuration to define a tubular cavity;
    forming at least one circumferentially extending first band portion having a first density and first thickness extending between the opposite edges; and
    forming at least one circumferentially extending second band portion having a second density that is greater than the first density of the at least one first band portion and a second thickness extending between the opposite edges, wherein the second thickness of the at least one second band portion is less than the first thickness of the at least one first band portion.

2. The method of claim 1 further including forming a plurality of said first band portions and a plurality of said second band portions in the nonwoven wall.

3. The method of claim 1 further including heat-setting material in the at least one second band portion during the heat-setting step so that the at least one second band portion exerts a bias force to bias the edges into the self-wrapped configuration.

4. The method of claim 3 further including avoiding heat-setting the at least one first band portion so that the at least one first portion has an increased flexibility relative to the at least one second portion.

5. The method of claim 1 further including forming the inner side having a smooth surface and forming the outer side having undulations of circumferentially extending peaks and troughs.

6. The method of claim 1 further including bonding a foil layer to at least one of the inner and outer sides.

7. A method of constructing a self-wrapping sleeve used to route and protect elongate members, comprising:
    forming an elongate non-woven wall having a thickness extending between opposite inner and outer sides and having opposite edges extending between opposite ends of the wall;
    heat-setting the non-woven wall into a self-wrapped configuration to define a tubular cavity;
    forming a plurality of first portions isolated from one another by at least one second portion, with the plurality of first portions having a first thickness extending between the inner and outer sides and a first density and with the at least one second portion having a second thickness extending between the inner and outer sides and a second density, wherein the first thickness is greater than the second thickness and the first density is less than the second density.

8. The method of claim 1 further including forming the at least one first band portion and the at least one second band portion having the same material composition.

9. The method of claim 7 further including forming the at least one first band portion and the at least one second band portion having the same material composition.

* * * * *